(12) United States Patent
Inoue

(10) Patent No.: US 10,175,552 B2
(45) Date of Patent: *Jan. 8, 2019

(54) OPTICAL MODULE, OPTICAL OBSERVATION DEVICE, AND LIGHT EXPOSURE DEVICE

(71) Applicant: HAMAMATSU PHOTONICS K.K., Hamamatsu-shi, Shizuoka (JP)

(72) Inventor: Takashi Inoue, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 427 days.

This patent is subject to a terminal disclaimer.

(21) Appl. No.: 14/782,021

(22) PCT Filed: Mar. 25, 2014

(86) PCT No.: PCT/JP2014/058290
§ 371 (c)(1),
(2) Date: Oct. 2, 2015

(87) PCT Pub. No.: WO2014/162927
PCT Pub. Date: Oct. 9, 2014

(65) Prior Publication Data
US 2016/0048069 A1    Feb. 18, 2016

(30) Foreign Application Priority Data

Apr. 5, 2013 (JP) .................... 2013-079806

(51) Int. Cl.
*G02F 1/19* (2006.01)
*G02B 27/28* (2006.01)
(Continued)

(52) U.S. Cl.
CPC ............. *G02F 1/19* (2013.01); *G02B 27/283* (2013.01); *H04N 5/2256* (2013.01); *H04N 5/372* (2013.01); *G02F 1/136* (2013.01)

(58) Field of Classification Search
CPC ............... G02B 27/26; G02B 27/2264; G02B 27/2207; G02B 27/2228; G03B 21/14;
(Continued)

(56) References Cited

U.S. PATENT DOCUMENTS 5,552,840 A    9/1996  Ishii et al.
5,701,201 A   12/1997  Okazaki
(Continued)

FOREIGN PATENT DOCUMENTS

CA    2 336 553     1/2007
CN    1441279       9/2003
(Continued)

OTHER PUBLICATIONS

P. Prieto et al., "Adaptive optics with a programmable phase modulator: applications in the human eye," Optical Societ of America (OSA), OPTICS EXPRESS, vol. 12, No. 17, Aug. 23, 2004, pp. 4059-4071.
(Continued)

*Primary Examiner* — Luke D Ratcliffe
(74) *Attorney, Agent, or Firm* — Drinker Biddle & Reath LLP

(57) ABSTRACT

An optical module (1A) includes a polarization beam splitter (10) that receives input light (L1) including a p-polarization component using a light splitting surface (11), a first polarization element (20) that rotates a polarization plane of the input light (L1) transmitted through the light splitting surface (11), a first reflective SLM (30) that modulates the input light (L1) to generate first modulation light (L2), a second polarization element (40) that rotates a polarization plane of the first modulation light (L2) passing through the first polarization element (20) again and reflected by the light splitting surface (11), and a second reflective SLM (50) that modulates the first modulation light (L2) to generate second
(Continued)

modulation light (L3). The second modulation light (L3) passes through the second polarization element (40) again, is transmitted through the light splitting surface (11), and then is output.

14 Claims, 8 Drawing Sheets

(51) Int. Cl.
    *H04N 5/225*    (2006.01)
    *H04N 5/372*    (2011.01)
    *G02F 1/136*    (2006.01)

(58) Field of Classification Search
    CPC ............... G03B 35/26; G03B 21/2073; G03B 21/2066; H04N 9/3167
    See application file for complete search history.

(56) References Cited

U.S. PATENT DOCUMENTS

| | | |
|---|---|---|
| 6,625,181 B1 | 9/2003 | Oshemkov et al. |
| 6,742,897 B1 | 6/2004 | Tajiri |
| 6,924,893 B2 | 8/2005 | Oldenbourg et al. |
| 7,148,936 B1 | 12/2006 | Hirota et al. |
| 7,990,611 B2 | 8/2011 | Betzig |
| 8,957,349 B2 | 2/2015 | Matsumoto et al. |
| 9,152,034 B2 * | 10/2015 | Yamaguchi ............ G02B 27/26 |
| 2003/0230710 A1 | 12/2003 | Wolleschensky et al. |
| 2006/0256261 A1 | 11/2006 | Chiang et al. |
| 2012/0147280 A1 | 6/2012 | Osterman et al. |
| 2012/0162609 A1 | 6/2012 | Yamaguchi |

FOREIGN PATENT DOCUMENTS

| | | |
|---|---|---|
| CN | 101191990 | 6/2008 |
| CN | 101606097 | 12/2009 |
| CN | 102385151 | 3/2012 |
| EP | 2 109 793 | 10/2009 |
| JP | S64-079722 | 3/1989 |
| JP | 2000-019455 A | 1/2000 |
| JP | 2001-091842 A | 4/2001 |
| JP | 2004-102225 A | 4/2004 |
| JP | 2005-144524 A | 6/2005 |
| JP | 2008-276043 A | 11/2008 |
| JP | 2010-518431 A | 5/2010 |
| JP | 4877963 | 2/2012 |
| JP | 5090783 | 12/2012 |
| WO | WO 01/037029 | 5/2001 |
| WO | WO 2008/010532 | 1/2008 |
| WO | WO 2008/095609 | 8/2008 |
| WO | WO-2008/105312 A1 | 9/2008 |

OTHER PUBLICATIONS

X. Zeng et al., "Parallel lensless optical correlator based on two phase-only spatial light modulators," Optical Society of America (OSA), OPTICS EXPRESS, vol. 19, No. 13, Jun. 20, 2011, pp. 12594-12604.

Chen Liu, "Engineering Optics", National Defense Industry Press, Aug. 31, 2012, p. 292-293 with attached English-language translation.

Mingyou Zhang, "Optically Controlled Phased Array Radar", National Defense Industry Press, Apr. 30, 2008, p. 83-84 with attached English-language translation.

Dingguo Sha, "Optical Testing Technology", Beijing Institute of Technology Press, Oct. 31, 2010, p. 138-139 with attached English-language translation.

* cited by examiner

OPTICAL MODULE, OPTICAL OBSERVATION DEVICE, AND LIGHT EXPOSURE DEVICE

TECHNICAL FIELD

The present invention relates to an optical module, an optical observation apparatus, and a light irradiation apparatus.

BACKGROUND ART

In Non-Patent Literature 1, a lensless optical correlator using two phase modulation type spatial light modulators (SLMs) is described. The optical correlator described in this literature includes a He—Ne laser light source that outputs laser light, a first reflective SLM that modulates the laser light, a second reflective SLM that is arranged parallel to the first reflective SLM and further modulates light output from the first reflective SLM, and a CCD camera that images light output from the second reflective SLM.

CITATION LIST

Non-Patent Literature

Non-Patent Literature 1: Xu Zeng, Takashi Inoue, Norihiro Fukuchi, and Jian Bai, "Parallel lensless optical correlator based on two phase-only spatial light modulators," OPTICSEXPRESS, Volume 19, Number 13, pp.12594-12604, June 20, 2011

SUMMARY OF INVENTION

Technical Problem

Recently, a technology for arbitrarily modulating an intensity distribution or a phase distribution of light using SLMs, and using such light for laser processing, illumination of an observation target, a lensless optical correlator, or the like has been studied. In such a technology, two or more SLMs may be arranged optically in series, for example, as described in Non-Patent Literature 1. For example, if a convex lens-shaped phase distribution is displayed in one of the SLMs, and a concave lens-shaped phase distribution is displayed in the other SLM, a beam expander that arbitrarily extends or reduces a diameter of parallel light can be configured. Alternatively, if the convex lens-shaped phase distribution is displayed in each of the two SLMs, a zoom lens can be configured.

Generally, there are a reflective SLM and a transmissive SLM. When the two SLMs are arranged optically in series as described above, a configuration is simplified and an entire optical system can be miniaturized by using the transmissive SLM. However, there is a problem with the transmissive SLM in that optical loss of the transmissive SLM is greater than the reflective SLM, and intensity of light after modulation is reduced as the number of SLMs increases.

On the other hand, in a conventional scheme, if reflective SLMs are arranged optically in series, relative positions and relative angles of a plurality of reflective SLMs are adjusted so that light is input to a modulation surface from a direction inclined with respect to a normal of the modulation surface (for example, see Non-Patent Literature 1). In such an arrangement, a configuration of the entire optical system including the plurality of reflective SLMs is complicated and miniaturization becomes difficult.

The present invention has been made in view of such problems, and an object thereof is to enable miniaturization of an entire optical system in an optical module, an optical observation apparatus, and a light irradiation apparatus in which a plurality of SLMs are arranged optically in series.

Solution to Problem

In order to solve the above problems, a first optical module according to the present invention includes a polarization beam splitter including a light splitting surface for reflecting an s-polarization component and transmitting a p-polarization component, and for inputting input light including the p-polarization component using the light splitting surface; a first polarization element having nonreciprocal optical activity, and for rotating a polarization plane of the input light transmitted through the light splitting surface; a first reflective spatial light modulator for modulating the input light passing through the first polarization element to generate first modulation light, and reflecting the first modulation light to the first polarization element; a second polarization element having nonreciprocal optical activity, and for rotating a polarization plane of the first modulation light that passes through the first polarization element again and is reflected by the light splitting surface; and a second reflective spatial light modulator for modulating the first modulation light that passes through the second polarization element to generate second modulation light, and reflecting the second modulation light to the second polarization element, wherein the second modulation light passes through the second polarization element again, is transmitted through the light splitting surface, and then is output.

Further, a second optical module according to the present invention includes a polarization beam splitter including a light splitting surface for reflecting an s-polarization component and transmitting a p-polarization component, and for inputting input light including the s-polarization component using the light splitting surface; a first polarization element having nonreciprocal optical activity, and for rotating a polarization plane of the input light reflected by the light splitting surface; a first reflective spatial light modulator for modulating the input light passing through the first polarization element to generate first modulation light, and reflecting the first modulation light to the first polarization element; a second polarization element having nonreciprocal optical activity, and for rotating a polarization plane of the first modulation light that passes through the first polarization element again and is transmitted through the light splitting surface; and a second reflective spatial light modulator for modulating the first modulation light that passes through the second polarization element to generate second modulation light, and reflecting the second modulation light to the second polarization element, wherein the second modulation light passes through the second polarization element again, is reflected by the light splitting surface, and then is output.

In these optical modules, the first and second reflective SLMs are arranged around one polarization beam splitter. Also, the light input to the first reflective SLM is input from the polarization beam splitter, and the light after modulation (first modulation light) is reflected to the polarization beam splitter. Similarly, light input to the second reflective SLM is input from the polarization beam splitter, and the light after modulation (second modulation light) is reflected to the polarization beam splitter. With this configuration, since the input light can be input and the modulation light can be reflected in the normal direction of the respective modulation surfaces of the first and second reflective SLMs, it is possible to simplify and miniaturize the configuration of the entire optical system, as compared to a configuration in which input light is input from a direction inclined with respect to a normal (see, for example, Non-Patent Literature 1).

Further, a scheme using a normal beam splitter (for example, a half minor) in place of the polarization beam splitter is also considered. However, for example, when the reflective SLM uses parallel-aligned nematic liquid crystal, only a linear polarization component of which a vibration direction is parallel to an alignment direction of the liquid crystal is modulated, and thus, when the light is input from a normal direction of the modulation surface using the normal beam splitter, light use efficiency (a ratio of input light intensity and modulation light intensity) becomes very low (for example, less than 25%). On the other hand, according to the above optical module, by combining the polarization beam splitter with the first and second polarization elements, light can preferably be input from the normal direction of the modulation surface while maintaining high light use efficiency.

Further, in the first and second optical modules, the polarization beam splitter includes a light input surface for inputting the input light; a light output surface for outputting the second modulation light; a first surface optically coupled to the first polarization element; and a second surface optically coupled to the second polarization element. Also, in this case, in the first optical module, it is preferable that the light input surface and the first surface be arranged side by side in a first direction, and that the light output surface and the second surface be arranged side by side in a second direction intersecting with the first direction.

Further, in the second optical module, it is preferable that the light input surface and the light output surface be arranged side by side in the first direction, and that the first surface and the second surface be arranged side by side in the second direction.

Further, in the first optical module, a third polarization element optically coupled to the light input surface may rotate the polarization plane of the input light so that the input light includes the p-polarization component. In the second optical module, a third polarization element optically coupled to the light input surface may rotate the polarization plane of the input light so that the input light includes the s-polarization component.

Further, the first and second optical modules may further include a ½-wavelength plate arranged either between the polarization beam splitter and the first reflective spatial light modulator or between the polarization beam splitter and the second reflective spatial light modulator.

Further, an optical observation apparatus according to the present invention includes: any one of the above optical modules; a mounting table on which an observation target is placed; a first light-guiding optical system for guiding light from the observation target to the polarization beam splitter as the input light; a second light-guiding optical system for guiding the second modulation light output from the polarization beam splitter; and an imaging device for imaging the second modulation light guided by the second light-guiding optical system.

Further, a light irradiation apparatus according to the present invention includes: any one of above optical modules; a mounting table on which the irradiation target is placed; a light source for outputting the input light that is input to the polarization beam splitter; and a light-guiding optical system for guiding the second modulation light output from the polarization beam splitter to the irradiation target.

Advantageous Effects of Invention

According to the present invention, it is possible to enable miniaturization of an entire optical system in an optical module, an optical observation apparatus, and a light irradiation apparatus in which a plurality of SLMs are arranged optically in series.

DESCRIPTION OF EMBODIMENTS

Hereinafter, embodiments of the optical module according to the present invention will be described in detail with reference to the accompanying drawings. Further, in the description of the drawings, the same elements are denoted with the same reference signs, and repeated description will be omitted.

(First Embodiment)

Figure 1:
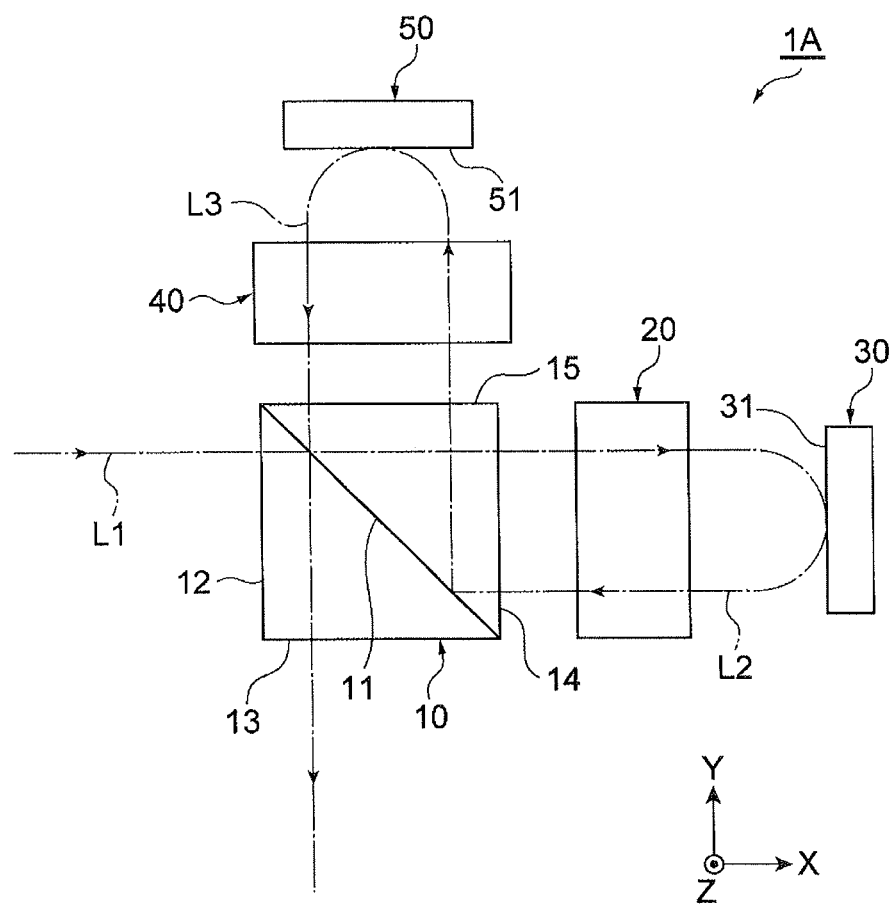
FIG. 1 is a diagram illustrating a configuration of an optical module according to a first embodiment of the present invention.

FIG. 1 is a diagram illustrating a configuration of an optical module 1A according to a first embodiment of the present invention. Further, for ease of understanding, an XYZ orthogonal coordinate system is shown together in FIG. 1. Further, in FIG. 1, for ease of understanding, an optical axis of light L2 and an optical axis of light L3 are separate, but the optical axis of the light L2 and the optical axis of the light L3 actually partially overlap. The same applies to the light L2 and the light L3. As illustrated in FIG. 1, the optical module 1A includes a polarization beam splitter 10, a first polarization element 20, a first reflective SLM 30, a second polarization element 40, and a second reflective SLM 50.

The polarization beam splitter 10 is an optical part having a light splitting surface 11. The light splitting surface 11 is inclined with respect to both of a first direction (an X-axis direction in this embodiment) and a second direction (a Y-axis direction in this embodiment) intersecting with the first direction, and its inclination angle is for example 45°.

The light splitting surface 11 reflects an s-polarization component of light input from these directions, and transmits a p-polarization component. The light splitting surface 11 receives the input light L1 which is input from the outside of the optical module 1A along the X-axis direction. This input light L1 is light including the p-polarization component and is, preferably, light in a linear polarization state that includes only a p-polarization component.

Further, a cross-sectional shape of the polarization beam splitter 10 along an XY plane is a rectangular shape. Also, the polarization beam splitter 10 includes a light input surface 12, a light output surface 13, a first surface 14, and a second surface 15 appearing in this cross section. The light input surface 12 is along a plane intersecting with the X-axis direction, and receives the input light L1. The light output surface 13 is along a plane intersecting with the Y-axis direction, and outputs modulation light L3. The first surface 14 is along the plane intersecting with the X-axis direction, and the light input surface 12 and the first surface 14 are arranged side by side in the X-axis direction. The second surface 15 is along a plane intersecting with the Y-axis direction, and the light output surface 13 and the second surface 15 are arranged side by side in the Y-axis direction. Among the four surfaces, the light input surface 12 and the light output surface 13 are arranged on one surface side of the light splitting surface 11, and the first surface 14 and the second surface 15 are arranged on the other surface side of the light splitting surface 11.

The first polarization element 20 is optically coupled to the first surface 14 of the polarization beam splitter 10. In other words, the first polarization element 20 is arranged beside the light splitting surface 11 in the X-axis direction. The first polarization element 20 has nonreciprocal optical activity for rotating the polarization plane of the input light L1 transmitted through the light splitting surface 11 of the polarization beam splitter 10. Here, the nonreciprocal optical activity means a nonreciprocal polarization characteristic that a direction of rotation of light traveling forward and a direction of rotation of light traveling in an opposite direction are the same as each other. For example, when the polarization plane of the light passing through the first polarization element 20 from any direction is rotated 45° in a predetermined direction, the polarization plane of light passing through the first polarization element 20 from an opposite direction is further rotated 45° in the above predetermined direction. In this case, when light reciprocates through the first polarization element 20, the polarization plane of the light is rotated 90°. The first polarization element 20 preferably includes a Faraday rotator in one example.

Further, while a ½-wavelength plate including an optical crystal also rotates the polarization plane of the passing light, the ½-wavelength plate has reciprocal optical activity that causes the rotation direction of light traveling forward and the rotation direction of the light traveling in the opposite direction to be opposite to each other, and thus, when the light reciprocates, the polarization plane of the light returns to an original state. Therefore, the ½-wavelength plate does not have nonreciprocal optical activity, and is not used as the first polarization element 20.

The first reflective SLM 30 modulates the input light L1 passing through the first polarization element 20 to generate first modulation light L2, and reflects the first modulation light L2 to the first polarization element 20. Various SLMs such as a phase modulation SLM, an intensity modulation (amplitude modulation) SLM, or a polarization modulation SLM are applied as the first reflective SLM 30. The first reflective SLM 30 has a modulation surface 31 including a plurality of one-dimensionally or two-dimensionally arranged areas (pixels). The first reflective SLM 30 modulates the phase, the strength or the like of the input light L1 in each of the plurality of areas to generate the first modulation light L2. In one example, the first reflective SLM 30 is an LCOS (Liquid Crystal on Silicon) SLM having parallel-aligned nematic liquid crystal. The first reflective SLM 30 is not limited to an electrically addressed liquid crystal element and may be, for example, an optically addressed liquid crystal element, or a deformable mirror type optical modulator.

The second polarization element 40 is optically coupled to the second surface 15 of the polarization beam splitter 10. In other words, the second polarization element 40 is arranged beside the light splitting surface 11 of the polarization beam splitter 10 in the Y-axis direction. From the second surface 15, the first modulation light L2 that is output from the first reflective SLM 30, passes through the first polarization element 20 again, and then is reflected in the Y-axis direction in the light splitting surface 11 is output. The second polarization element 40 has nonreciprocal optical activity for rotating the polarization plane of the first modulation light L2 output from the second surface 15. Further, the definition of the nonreciprocal optical activity is the same as that in the first polarization element 20 described above. The second polarization element 40 preferably includes a Faraday rotator in one example.

The second reflective SLM 50 modulates the first modulation light L2 that has passed through the second polarization element 40 to generate second modulation light L3, and reflects the second modulation light L3 to the second polarization element 40. Various SLMs such as a phase modulation SLM, an intensity modulation (amplitude modulation) SLM, or a polarization modulation SLM are applied as the second reflective SLM 50, similarly to the first reflective SLM 30. The second reflective SLM 50 has a modulation surface 51 including a plurality of one-dimensionally or two-dimensionally arranged areas (pixels). The second reflective SLM 50 modulates a phase, strength or the like of the first modulation light L2 in each of the plurality of areas to generate the second modulation light L3. In one example, the second reflective SLM 50 is an LCOS type SLM having parallel-aligned nematic liquid crystal. The second reflective SLM 50 is not limited to an electrically addressed liquid crystal element and may be, for example, an optically addressed liquid crystal element, or a deformable mirror type optical modulator.

Further, when the reflective SLMs 30 and 50 are LCOS type SLMs, only a linear polarization component of which a vibration direction is parallel to an alignment direction of the liquid crystal is modulated, and thus the reflective SLMs 30 and 50 may be arranged according to the angle of the polarization plane after the rotation by the polarization elements 20 and 40.

An operation of the optical module 1A having the above configuration will be described with reference to FIG. 1. The input light L1 input to the light input surface 12 of the polarization beam splitter 10 in the X-axis direction is transmitted through the light splitting surface 11 and output from the first surface 14. Then, the input light L1 passes through the first polarization element 20. In this case, the polarization plane of the input light L1 is rotated, for example, 45° in a predetermined direction from a p-polarization plane by the first polarization element 20. Then, the input light L1 is modulated by the first reflective SLM 30 to be the first modulation light L2, and is simultaneously reflected to the first polarization element 20. The first modulation light L2 passes through the first polarization element 20 again. In this case, the polarization plane of the first modulation light L2 is rotated, for example, 45° in the above predetermined direction by the first polarization element 20. As a result, the first modulation light L2 mainly includes the s-polarization component (or consists of only the s-polarization component). Accordingly, the first modulation light L2 is reflected by the light splitting surface 11 and output from the second surface 15.

Then, the first modulation light L2 passes through the second polarization element 40. In this case, the polarization plane of the first modulation light L2 is rotated, for example, 45° in a predetermined direction from the s-polarization plane by the second polarization element 40. Then, the first modulation light L2 is modulated by the second reflective SLM 50 to be the second modulation light L3 and simultaneously reflected to the second polarization element 40. The second modulation light L3 passes through the second polarization element 40 again. In this case, the polarization plane of the second modulation light L3 is rotated, for example, 45° in the above predetermined direction by the second polarization element 40. As a result, the second modulation light L3 mainly includes the p-polarization component (or consists of only the p-polarization component). Accordingly, the second modulation light L3 is transmitted through the light splitting surface 11 and output from the light output surface 13 to the outside of the optical module 1A.

Figure 2:
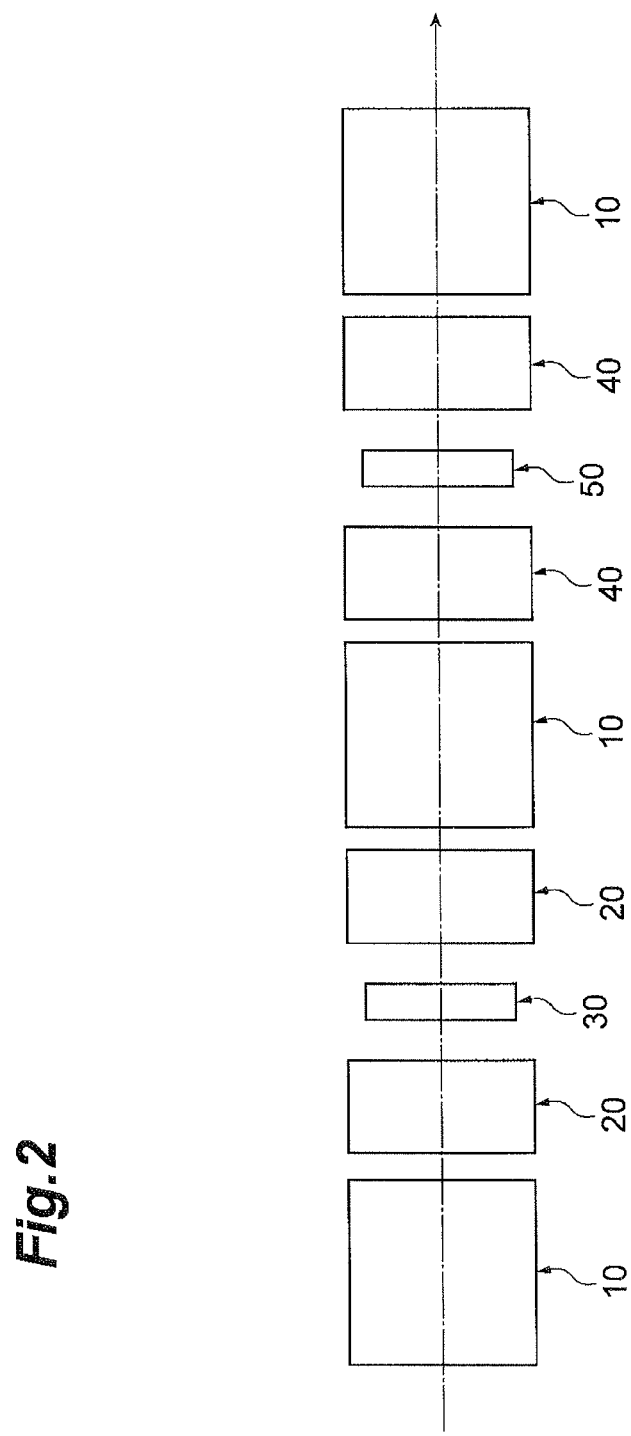
FIG. 2 is a diagram illustrating an equivalent optical path when an optical path of the optical module of the first embodiment is developed in a straight line shape, for comparison.

Effects obtained by the optical module 1A of the present embodiment described above will be described. In the optical module 1A, the two reflective SLMs 30 and 50 are arranged around the one polarization beam splitter 10. Also, the light (input light L1) input to the first reflective SLM 30 is input from the polarization beam splitter 10, and the light after modulation (first modulation light L2) is reflected to the polarization beam splitter 10. Similarly, the light (first modulation light L2) input to the second reflective SLM 50 is input from the polarization beam splitter 10, and the light after modulation (second modulation light L3) is reflected to the polarization beam splitter 10. With this configuration, since the light can be input and reflected in the normal direction of the respective modulation surfaces 31 and 51 of the reflective SLMs 30 and 50, it is easy to adjust the optical axis, and it is possible to increase efficiency of input on the SLM and efficiency of output from the SLM. Therefore, according to this optical module 1A, it is possible to increase light use efficiency. Further, since the optical axis of the input light L1 and the optical axis of the output light (the second modulation light L3) are orthogonal rather than oblique, it is possible to facilitate a connection to another optical system and reduce generation of aberrations. Further, since the light is caused to reciprocate in a part of the optical path, it is possible to simplify and miniaturize the configuration of the entire optical system. Further, FIG. 2 is a diagram illustrating an equivalent optical path when the optical path of the optical module 1A is developed in a straight line shape, for comparison. The optical module 1A of this embodiment can be seen to be configured with a smaller size than the configuration illustrated in FIG. 2.

Further, a scheme using a normal beam splitter (for example, a half mirror) in place of the polarization beam splitter 10 can also be considered as a scheme different from that of the present embodiment. However, for example, when the reflective SLMs 30 and 50 use parallel-aligned nematic liquid crystal, only a linear polarization component of which the vibration direction is parallel to an alignment direction of the liquid crystal is modulated, and thus, when the light is input from the normal direction of the modulation surface using the normal beam splitter, the light use efficiency becomes very small (for example, less than 25%). On the other hand, according to the optical module 1A of this embodiment, by combining the polarization beam splitter 10 with the first and second polarization elements 20 and 40, the input light L1 and the first modulation light L2 can preferably be input from the normal direction of the modulation surfaces 31 and 51 while maintaining high light use efficiency.

(First Modification Example)

Figure 3:
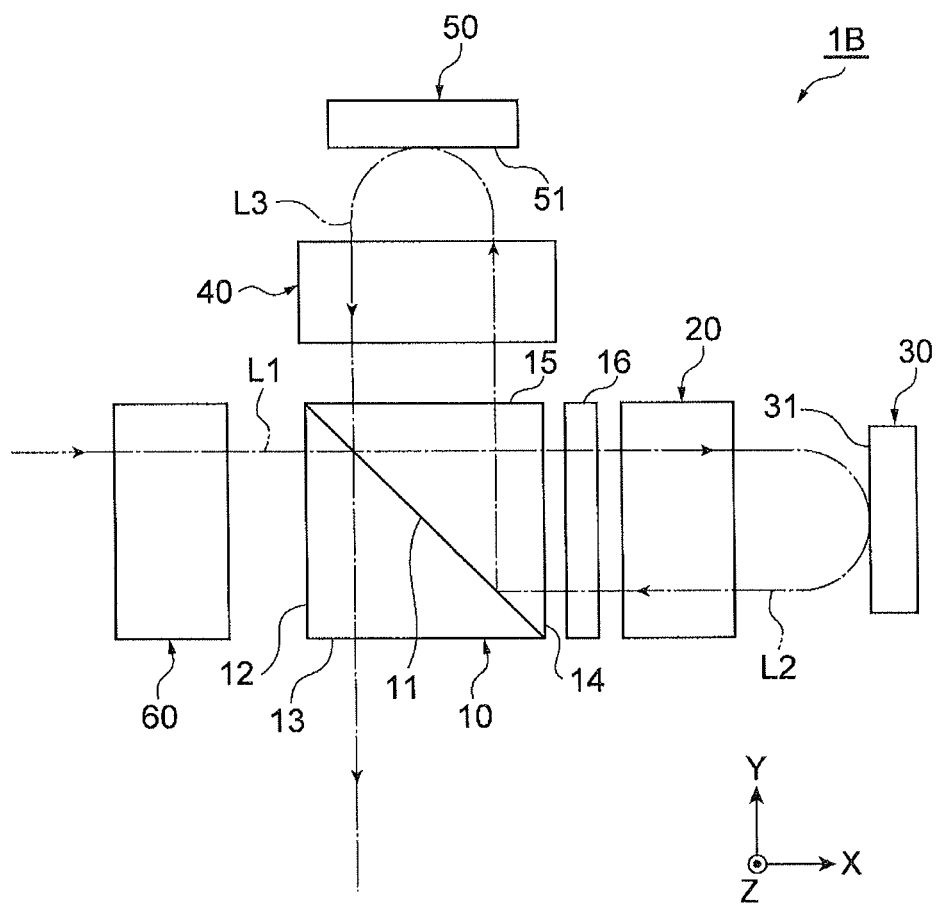
FIG. 3 is a diagram illustrating a configuration of an optical module as a modification example of the first embodiment.

FIG. 3 is a diagram illustrating a configuration of an optical module 1B as a modification example of the above embodiment. This optical module 1B further includes a third polarization element 60, in addition to the configuration of the optical module 1A illustrated in FIG. 1. The third polarization element 60 is optically coupled to the light input surface 12 of the polarization beam splitter 10, and rotates the polarization plane of the input light L1 so that the input light L1 includes a p-polarization component. Further, a polarization element having nonreciprocal optical activity, such as a Faraday rotator, can be applied as the third polarization element 60, similarly to the first and second polarization elements 20 and 40. According to this modification example, it is possible to cause the input light L1 to be preferably transmitted through the light splitting surface 11 by adjusting the polarization plane of the input light L1.

Further, the optical module 1B illustrated in FIG. 3 further includes a ½-wavelength plate 16 that is a polarization element having reciprocal optical activity, in addition to the configuration of the optical module 1A of the above embodiment. In this modification example, the ½-wavelength plate 16 is arranged on an optical path between the polarization beam splitter 10 and the first reflective SLM 30. An example in which the ½-wavelength plate 16 is arranged on an optical path between the polarization beam splitter 10 and the first polarization element 20 is illustrated in FIG. 3.

In this example, the input light Li transmitted through the light splitting surface 11 of the polarization beam splitter 10 passes through the ½-wavelength plate 16. In this case, the polarization plane of the input light L1 is rotated 90° in a certain rotation direction from a p-polarization plane by the ½-wavelength plate 16. Then, the input light L1 reciprocates between the first polarization element 20 and the first reflective SLM 30 to be the first modulation light L2, and passes through the ½-wavelength plate 16 again. In this case, the polarization plane of the first modulation light L2 is rotated 90° in a direction opposite to the above direction by the ½-wavelength plate 16. As a result, the polarization plane of the first modulation light L2 when the first modulation light L2 is input to the polarization beam splitter 10 mainly includes an s-polarization component (or consists of only the s-polarization component). Accordingly, the first modulation light L2 is reflected by the light splitting surface 11 and output from the second surface 15.

In this modification example, the polarization plane of the input light L1 is rotated 90° when the input light L1 is input to the first reflective SLM 30. Accordingly, the angle of the polarization plane of the input light L1 immediately before the input light L1 is input to the first reflective SLM 30 can be arbitrarily controlled. Thus, for example, when the first and second reflective SLMs 30 and 50 are liquid crystal SLMs, an alignment direction of liquid crystal of the first reflective SLM 30 can be arbitrarily set. Accordingly, for example, the alignment direction of the liquid crystal of the first reflective SLM 30 and the alignment direction of the liquid crystal of the second reflective SLM 50 can be aligned (parallelized to each other), and modulation data input to the first and second reflective SLMs 30 and 50 can be common.

Further, the ½-wavelength plate 16 may be arranged on the optical path between the first polarization element 20 and the first reflective SLM 30 or may be arranged on the optical path between the polarization beam splitter 10 and the second reflective SLM 50 (between the polarization beam splitter 10 and the second polarization element 40 or between the second polarization element 40 and the second reflective SLM 50). When the ½-wavelength plate 16 is arranged on the optical path between the polarization beam splitter 10 and the second reflective SLM 50, an angle of the polarization plane of the first modulation light L2 immediately before the first modulation light L2 is input to the second reflective SLM 50 can be arbitrarily controlled, and it is possible to achieve the same effects as described above.

(Second Embodiment)

Figure 4:
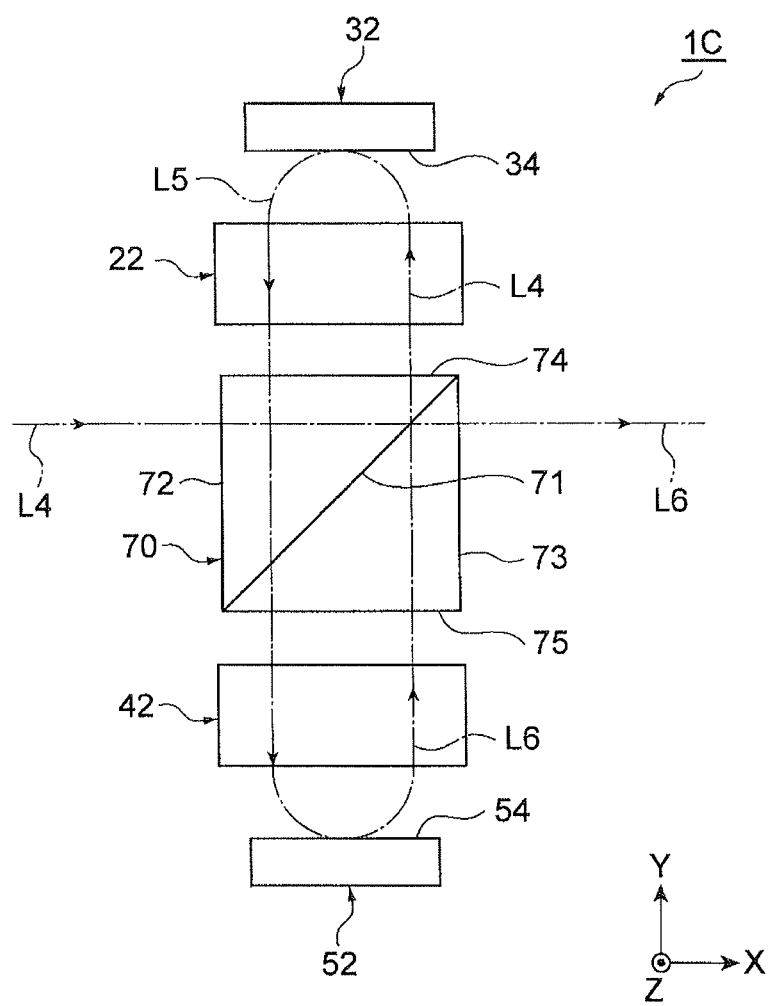
FIG. 4 is a diagram illustrating a configuration of an optical module according to a second embodiment of the present invention.

FIG. 4 is a diagram illustrating a configuration of an optical module 1C according to a second embodiment of the present invention. Further, for ease of understanding, an XYZ orthogonal coordinate system is illustrated in FIG. 4. Further, in FIG. 4, for ease of understanding, an optical axis of light L4 and an optical axis of light L5 are separate, but in fact, the optical axis of the light L4 and the optical axis of the light L5 partially overlap. The same applies to the light L5 and the light L6. As illustrated in FIG. 4, this optical module 1C includes a polarization beam splitter 70, a first polarization element 22, a first reflective SLM 32, a second polarization element 42, and a second reflective SLM 52.

The polarization beam splitter 70 is an optical component having a light splitting surface 71. The light splitting surface 71 is inclined with respect to both a first direction (an X-axis direction in this embodiment) and a second direction (a Y-axis direction in this embodiment) intersecting with the first direction, and an inclination angle is, for example, 45°. The light splitting surface 71 reflects an s-polarization component of light input in these directions, and transmits a p-polarization component. The light splitting surface 71 receives input light 1A that is input from the outside of the optical module 1C along the X-axis direction. The input light L4 is light including the s-polarization component, and is preferably light in a linear polarization state including only the s-polarization component.

The same polarization beam splitter as the polarization beam splitter 10 of the first embodiment may be used as the polarization beam splitter 70 of this embodiment, but a different direction of the light splitting surface is different from that of the polarization beam splitter 10. Specifically, a cross-sectional shape of the polarization beam splitter 70 along an XY plane is a rectangular shape, and the polarization beam splitter 70 includes a light input surface 72, a light output surface 73, a first surface 74, and a second surface 75 that appear in this section. The light input surface 72 is along a plane intersecting with the X-axis direction, and receives the input light L4. The light output surface 73 is along a plane intersecting with the X-axis direction, and the light input surface 72 and the light output surface 73 are aligned side by side in the X-axis direction. The first surface 74 is along a plane intersecting with the Y-axis direction. The second surface 75 is along a plane intersecting with the Y-axis direction, and the first surface 74 and the second surface 75 are arranged side by side in the Y-axis direction. Among these four surfaces, the light input surface 72 and the first surface 74 are arranged on one surface side of the light splitting surface 71, and the light output surface 73 and the second surface 75 are arranged on the other surface side of the light splitting surface 71.

The first polarization element 22 is optically coupled to the first surface 74 of the polarization beam splitter 70. In other words, the first polarization element 22 is arranged beside the light splitting surface 71 of the polarization beam splitter 70 in the Y-axis direction. The first polarization element 22 has nonreciprocal optical activity for rotating the polarization plane of the input light L4 transmitted through the light splitting surface 71. Further, a definition of the nonreciprocal optical activity is the same as that of the first polarization element 20 in the first embodiment. The first polarization element 22 preferably includes a Faraday rotator in one example.

The first reflective SLM 32 modulates the input light L4 which has passed through the first polarization element 22 to generate first modulation light L5, and reflects the first modulation light L5 to the first polarization element 22. Various SLMs such as a phase modulation SLM, an intensity modulation (amplitude modulation) SLM, or a polarization modulation SLM are applied as the first reflective SLM 32. The first reflective SLM 32 has a modulation surface 33 including a plurality of one-dimensionally or two-dimensionally arranged areas (pixels). The first reflective SLM 32 modulates a phase, strength or the like of the input light L4 in each of the plurality of areas to generate the first modulation light L5. In one example, the first reflective SLM 32 is an LCOS type SLM having parallel-aligned nematic liquid crystal. The first reflective SLM 32 is not limited to an electrically addressed liquid crystal element and may be, for example, an optically addressed liquid crystal element, or a deformable mirror type optical modulator.

The second polarization element 42 is optically coupled to the second surface 75 of the polarization beam splitter 70. In other words, the second polarization element 42 is arranged beside the light splitting surface 71 of the polarization beam splitter 70 in the Y-axis direction so that the light splitting surface 71 of the polarization beam splitter 70 is located between the first polarization element 22 and the second polarization element 42. From the second surface 75, the first modulation light L5 that is output from the first reflective SLM 32, passes through the first polarization element 22 again, and then is transmitted through the light splitting surface 71 is output. The second polarization element 42 has nonreciprocal optical activity for rotating the polarization plane of the first modulation light L5 output from the second surface 75. Further, a definition of the nonreciprocal optical activity is the same as that of the first polarization element 20 in the first embodiment. The second polarization element 42 preferably includes a Faraday rotator in one example.

The second reflective SLM 52 modulates the first modulation light L5 which has passed through the second polarization element 42 to generate second modulation light L6, and reflects the second modulation light L6 to the second polarization element 42. Various SLMs such as a phase modulation SLM, an intensity modulation (amplitude modulation) SLM, or a polarization modulation SLM are applied as the second reflective SLM 52, as in the first reflective SLM 32. The second reflective SLM 52 has a modulation surface 53 including a plurality of one-dimensionally or two-dimensionally arranged areas (pixels). The second reflective SLM 52 modulates a phase, strength or the like of the first modulation light L5 in each of the plurality of areas to generate second modulation light L6. In one example, the second reflective SLM 52 is an LCOS type SLM having parallel-aligned nematic liquid crystal. Further, the second reflective SLM 52 is not limited to an electrically addressed liquid crystal element and may be, for example, an optically addressed liquid crystal element, or a deformable mirror type optical modulator.

An operation of the optical module 1C having the above configuration will be described with reference to FIG. 4. The input light L4 input to the light input surface 72 of the polarization beam splitter 70 in the X-axis direction is reflected in the Y-axis direction in the light splitting surface 71 and output from the first surface 74. Then, the input light L4 passes through the first polarization element 22. In this case, the polarization plane of the input light L4 is rotated, for example, 45° in a predetermined direction from the s-polarization plane by the first polarization element 22. Then, the input light L4 is modulated by the first reflective SLM 32 to be the first modulation light L5, and is simultaneously reflected to the first polarization element 22. The first modulation light L5 passes through the first polarization element 22 again. In this case, the polarization plane of the first modulation light L5 is rotated, for example, 45° in the above predetermined direction by the first polarization element 22. As a result, the first modulation light L5 mainly includes the p-polarization component (or consists of only the p-polarization component). Accordingly, the first modulation light L5 is transmitted through the light splitting surface 71 and output from the second surface 75.

Then, the first modulation light L5 passes through the second polarization element 42. In this case, the polarization plane of the first modulation light L5 is rotated, for example, 45° in a predetermined direction from the p-polarization plane by the second polarization element 42. Then, the first modulation light L5 is modulated by the second reflective SLM 52 to be the second modulation light L6 and simultaneously reflected to the second polarization element 42. The second modulation light L6 passes through the second polarization element 42 again. In this case, the polarization plane of the second modulation light L6 is rotated, for example, 45° in the above predetermined direction by the second polarization element 42. As a result, the second modulation light L6 mainly includes the s-polarization component (or consists of only the s-polarization component). Accordingly, the second modulation light L6 is reflected in the X-direction in the light splitting surface 71 and output from the light output surface 73 to the outside of the optical module 1C.

According to the optical module 1C of this embodiment described above, it is possible to obtain the same effects as those of the optical module 1A of the first embodiment described above. That is, in the optical module 1C, the two reflective SLMs 32 and 52 are arranged around one polarization beam splitter 70. Also, the light (input light L4) input to the first reflective SLM 32 is input from the polarization beam splitter 70, and the light after modulation (first modulation light L5) is reflected to the polarization beam splitter 70. Similarly, light (first modulation light L5) input to the second reflective SLM 52 is input from the polarization beam splitter 70, and the light after modulation (second modulation light L6) is reflected to the polarization beam splitter 70. With this configuration, the light can be input and reflected in normal directions of the respective modulation surfaces 33 and 53 of the reflective SLMs 32 and 52, and thus it is easy to adjust the optical axis and it is possible to increase efficiency of input to the SLM and efficiency of output from the SLM. Further, since the optical axis of the input light L4 and the optical axis of the output light (second modulation light L6) can be orthogonal rather than oblique, it is possible to facilitate a connection to another optical system and to reduce generation of aberrations. Further, since the light is caused to reciprocate in a part of the optical path, it is possible to simplify and miniaturize the configuration of the entire optical system.

Further, in the present embodiment, by including a configuration in which the polarization beam splitter 70 and the first and second polarization elements 22 and 42 are combined, rather than a normal beam splitter such as a half mirror, it is possible to cause the input light L4 and the first modulation light L5 to be preferably input from the normal direction of the modulation surfaces 33 and 53 while maintaining high light use efficiency.

(Second Modification Example)

Figure 5:
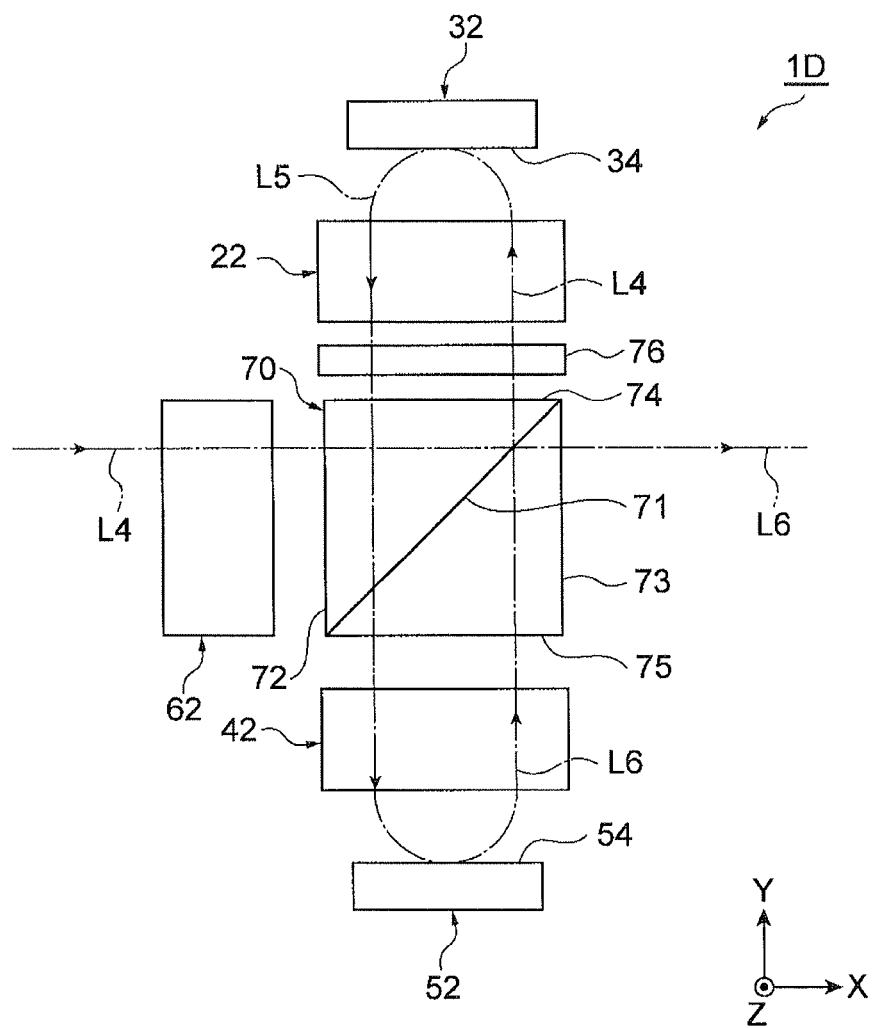
FIG. 5 is a diagram illustrating a configuration of an optical module as a modification example of the second embodiment.

FIG. 5 is a diagram illustrating a configuration of an optical module 1D as a modification example of the above embodiment. This optical module 1D further includes a third polarization element 62, in addition to the configuration of the optical module 1C illustrated in FIG. 4. The third polarization element 62 is optically coupled to a light input surface 72 of a polarization beam splitter 70, and rotates a polarization plane of an input light L4 so that the input light L4 includes an s-polarization component. Further, for example, a Faraday rotator is a polarization element having nonreciprocal optical activity that can be applied as the third polarization element 62, similar to the first and second polarization elements 22 and 42. According to this modification example, the polarization plane of the input light L4 can be adjusted and the input light L4 can preferably be reflected by the light splitting surface 71.

Further, the optical module 1D illustrated in FIG. 5 further includes a ½-wavelength plate 76 that is a polarization element having reciprocal optical activity, in addition to the configuration of the optical module 1C of the above embodiment. In this modification example, the ½-wavelength plate 76 is arranged on an optical path between the polarization beam splitter 70 and a first reflective SLM 32. In FIG. 5, an example in which the ½-wavelength plate 76 is arranged on an optical path between the polarization beam splitter 70 and the first polarization element 22 is shown.

In this example, the input light L4 reflected by the light splitting surface 71 of the polarization beam splitter 70 passes through the ½-wavelength plate 76. In this case, the polarization plane of the input light L4 is rotated 90° in a certain rotation direction from an s-polarization plane by the ½-wavelength plate 76. Then, the input light L4 reciprocates between the first polarization element 22 and the first reflective SLM 32 to be first modulation light L5, and passes through the ½-wavelength plate 76 again. In this case, a polarization plane of the first modulation light L5 is rotated 90° in a direction opposite to the above direction by the ½-wavelength plate 76. As a result, the polarization plane of the first modulation light L5 when the first modulation light L5 is input to the polarization beam splitter 70 mainly includes a p-polarization component (or consists of only the p-polarization component). Accordingly, the first modulation light L5 is transmitted through the light splitting surface 71 and is output from the second surface. 75.

In this modification example, the polarization plane of the input light L4 is rotated 90° when the input light L4 is input to the first reflective SLM 32. Accordingly, an angle of the polarization plane of the input light L4 immediately before the input light L4 is input to the first reflective SLM 32 can be arbitrarily controlled. Therefore, for example, when the first and second reflective SLMs 32 and 52 are liquid crystal SLMs, an alignment direction of liquid crystal of the first reflective SLM 32 can be arbitrarily set. Accordingly, for example, the alignment direction of the liquid crystal of the first reflective SLM 32 and the alignment direction of the liquid crystal of the second reflective SLM 52 can be aligned (parallelized to each other), and modulation data input to the first and second reflective SLMs 32 and 52 can be common.

Further, the ½-wavelength plate 76 may be arranged on an optical path between the first polarization element 22 and the first reflective SLM 32 or may be arranged on an optical path between the polarization beam splitter 70 and the second reflective SLM 52 (between the polarization beam splitter 70 and the second polarization element 42 or between the second polarization element 42 and the second reflective SLM 52). If the ½-wavelength plate 76 is arranged on the optical path between the polarization beam splitter 70 and the second reflective SLM 52, an angle of the polarization plane of the first modulation light L5 immediately before the first modulation light L5 is input to the second reflective SLM 52 can be arbitrarily controlled, and it is possible to similarly achieve the effects described above.

(Third Embodiment)

Figure 6:
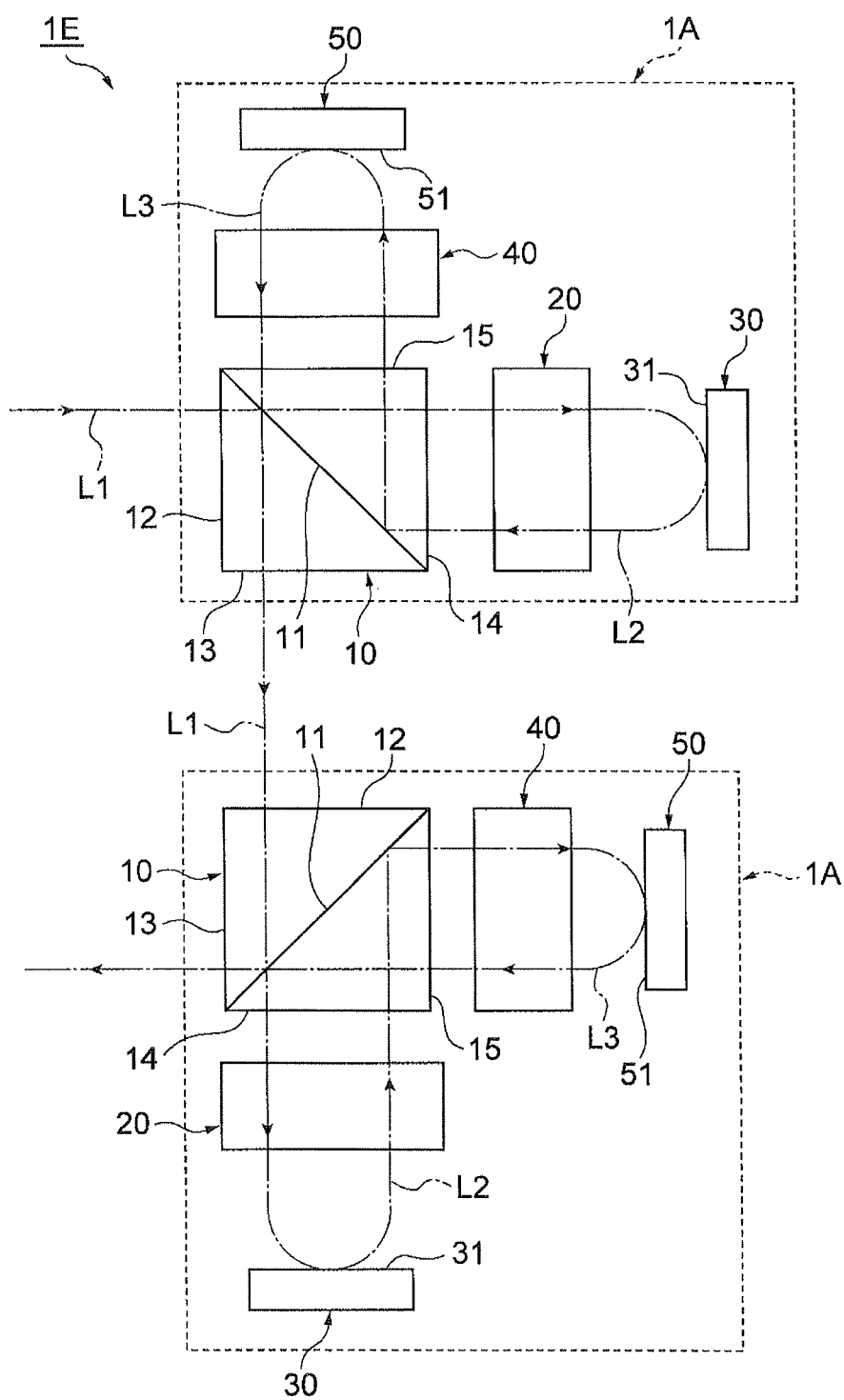
FIG. 6 is a diagram illustrating a configuration of an optical module according to a third embodiment of the present invention.

FIG. 6 is a diagram illustrating a configuration of an optical module 1E according to a third embodiment of the present invention. As illustrated in FIG. 6, this optical module 1E is configured by combining two of the optical modules 1A illustrated in FIG. 1. That is, a light output surface 13 of one of the optical modules 1A is optically coupled to a light input surface 12 of the other optical module 1A, and second modulation light L3 output from the one optical module 1A is input as input light L1 to the other optical module 1A.

As in the present embodiment, the optical module may be configured by combining the optical modules 1A to 1D of the respective embodiments and the respective modification examples described above in multiple stages. In this case, the optical modules having the same configuration may be combined or the optical modules having the different configuration may be combined. Accordingly, it is possible to arrange three or more SLMs optically in series.

The optical module according to the present invention is not limited to the above-described embodiments, and various other modifications are possible. For example, while the polarization beam splitter having a rectangular sectional shape (cube type) has been illustrated as the polarization beam splitter in each embodiment and each modification example described above, polarization beam splitters having various shapes, such as a plate-type polarization beam splitter, can be applied in the present invention.

Further, while the optical axis of the output light (the second modulation light) forms an angle of 90° or 0° with respect to the optical axis of the light input to the polarization beam splitter in each embodiment and each modification example described above, the SLM or the polarization element can be arranged so that the optical axes form other angles.

Further, in each embodiment and each modification example described above, the polarization beam splitter (cube) having a rectangular sectional shape is used as described above, but the light splitting surface of the cube type polarization beam splitter may have a lower flatness than a plate type polarization beam splitter, a shape of the light splitting surface may be distorted, and wavefront aberrations may be applied to the reflected light. Similarly, in the modulation surface of the SLM, wavefront aberrations may be caused in the modulation light due to distortion. Thus, when there is a cause of aberrations in the optical module of the present invention, the aberrations may be found in advance, and a phase modulation pattern capable of removing the aberrations may be added to a desired phase modulation pattern of each SLM. Accordingly, it is possible to realize a modulation operation insusceptible to aberrations.

Further, in each embodiment and each modification example described above, adjustment of spacing between the SLM and the polarization beam splitter may be required according to the use of the optical module. In such a case, it is preferable for a moving means for changing the spacing between the SLM and the polarization beam splitter in an optical axis direction to be provided in the SLM.

Figure 7:
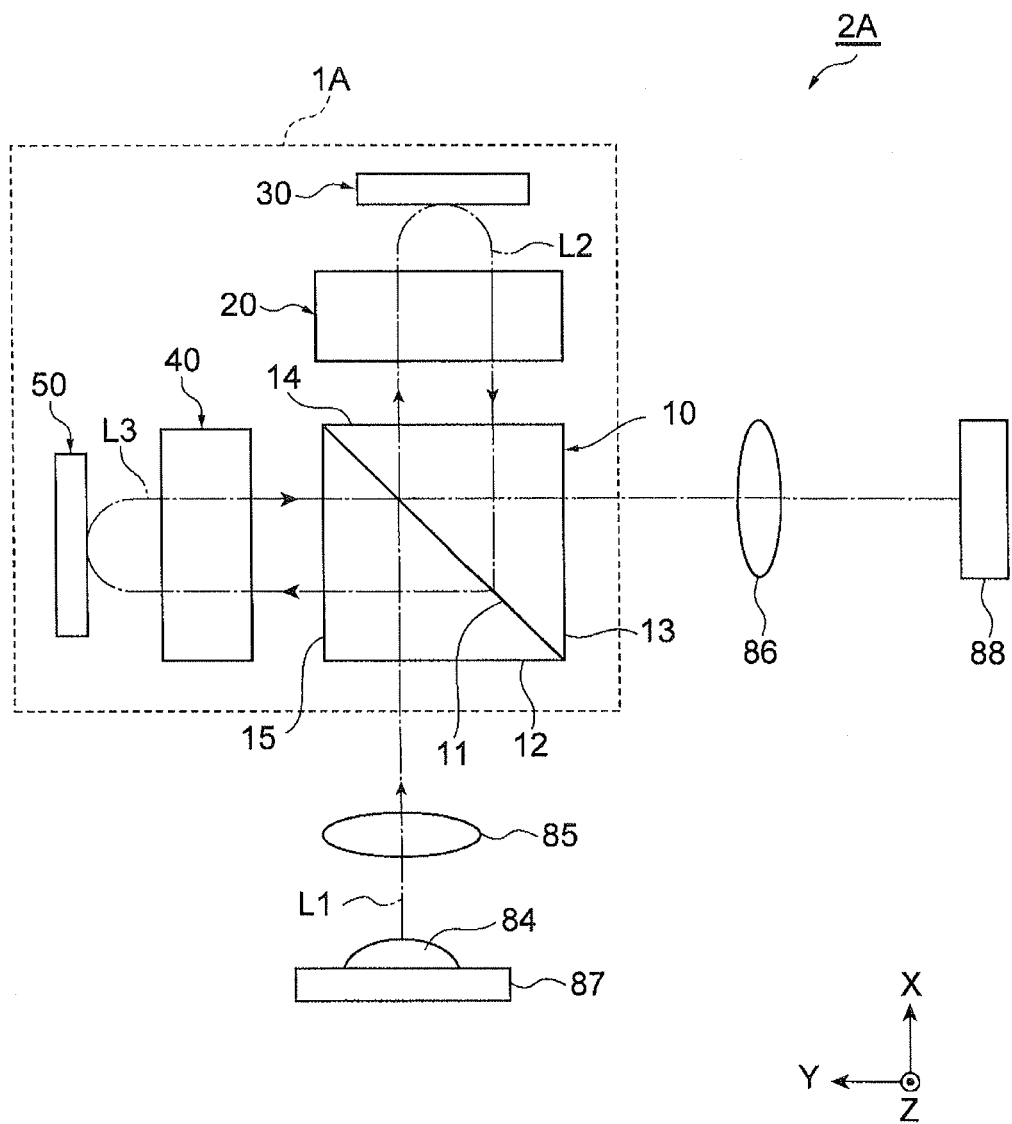
FIG. 7 is a diagram illustrating an example of a configuration of an optical observation apparatus.

Further, the use of the optical module in each embodiment or each modification example described above may include an optical observation apparatus that images light from the observation target. FIG. 7 is a diagram illustrating an example of a configuration of the optical observation apparatus 2A. This optical observation apparatus 2A includes an optical module of any embodiment or modification example described above (the optical module 1A of the first embodiment is illustrated in FIG. 7), a mounting table 87 on which an observation target 84 is placed, a first light-guiding optical system 85 that guides light from the observation target 84 as input light L1 (or L4) to a polarization beam splitter 10 (or 70), a second light-guiding optical system 86 that guides second modulation light L3 (or L6) output from the polarization beam splitter 10 (or 70), and an imaging device 88 that images the second modulation light L3 (or L6) guided by the second light-guiding optical system 86. The first light-guiding optical system 85 includes, for example, an objective lens. The second light-guiding optical system 86 includes, for example, an optical element such as an image forming lens or a relay lens. Further, the imaging device 88 includes an imaging element such as a CCD image sensor or a CMOS image sensor. Alternatively, the second light-guiding optical system 86 may include a beam scanner, a relay lens, and an image forming lens, and the imaging device 88 may include a pin hole and a single photodetector.

Figure 8:
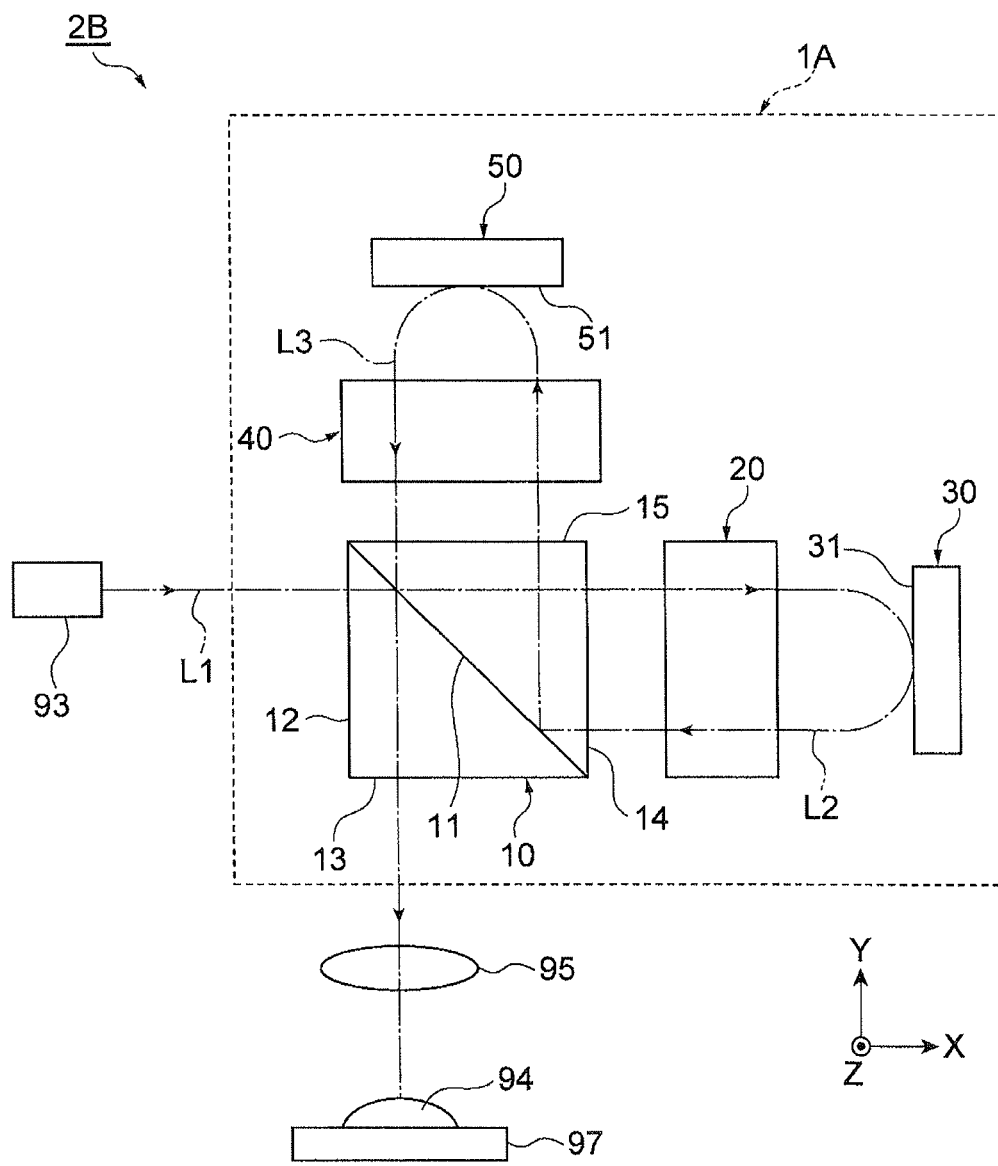
FIG. 8 is a diagram illustrating an example of a configuration of the light irradiation apparatus.

Further, another use of the optical module in each embodiment or each modification example described above includes a light irradiation apparatus that irradiates an irradiation target with light. FIG. 8 is a diagram illustrating an example of a configuration of a light irradiation apparatus 2B. This light irradiation apparatus 2B includes an optical module of any embodiment or modification example described above (the optical module 1A of the first embodiment is illustrated in FIG. 8), a mounting table 97 on which an irradiation target 94 is placed, a light source 93 that outputs input light L1 (or L4) that is input to the polarization beam splitter 10 (or 70), and a light-guiding optical system 95 that guides second modulation light L3 (or L6) output from the polarization beam splitter 10 (or 70) to the irradiation target 94. The light source 93 may include a laser light source such as a semiconductor laser element, an LED, an SLD, or a lamp-based light source. Further, the light-guiding optical system 95 includes an objective lens or the like.

INDUSTRIAL APPLICABILITY

The present invention can be applied to miniaturization of an entire optical system in an optical module, an optical observation apparatus, and a light irradiation apparatus in which a plurality of SLMs are arranged optically in series.

REFERENCE SIGNS LIST

1A, 1B, 1C, 1D, 1E: optical module, 10, 70: polarization beam splitter, 11, 71: light splitting surface, 12, 72: light input surface, 13, 73: light output surface, 14, 74: first surface, 15, 75: second surface, 16, 76: ½-wavelength plate, 20, 22: first polarization element, 30, 32: first reflective SLM, 31, 33: modulation surface, 40, 42: second polarization element, 50, 52: second reflective SLM, 51, 53: modulation surface, 60, 62: third polarization element, L1, L4: input light, L2, L5: first modulation light, L3, L6: second modulation light.

The invention claimed is:

1. An optical module, comprising:
a polarization beam splitter including a light splitting surface configured to reflect an s-polarization component transmit a p-polarization component, and input input light including the p-polarization component;
a first polarization element having nonreciprocal optical activity, and configured to rotate a polarization plane of the input light transmitted through the light splitting surface;
a first reflective spatial light modulator configured to modulate the input light passing through the first polarization element to generate first modulation light, and reflect the first modulation light to the first polarization element;
a second polarization element having nonreciprocal optical activity, and configured to rotate a polarization plane of the first modulation light that passes through the first polarization element again and is reflected by the light splitting surface; and
a second reflective spatial light modulator configured to modulate the first modulation light that passes through the second polarization element to generate second modulation light, and reflect the second modulation light to the second polarization element,
wherein the second modulation light passes through the second polarization element again, is transmitted through the light splitting surface, and then is output.

2. The optical module according to claim 1,
wherein the polarization beam splitter includes
a light input surface configured to input the input light;
a light output surface configured to output the second modulation light;
a first surface optically coupled to the first polarization element; and
a second surface optically coupled to the second polarization element.

3. The optical module according to claim 2,
wherein the light input surface and the first surface are arranged side by side in a first direction, and
the light output surface and the second surface are arranged side by side in a second direction intersecting with the first direction.

4. The optical module according to claim 2, further comprising:
a third polarization element optically coupled to the light input surface,
wherein the third polarization element rotates the polarization plane of the input light so that he input light includes the p-polarization component.

5. An optical module, comprising:
a polarization beam splitter including a light splitting surface configured to reflect an s-polarization component and transmit a p-polarization component, and input input light including the s-polarization component using the light splitting surface;
a first polarization element having nonreciprocal optical activity, and configured to rotate a polarization plane of the input light reflected by the light splitting surface;
a first reflective spatial light modulator configured to modulate the input light passing through the first polarization element to generate first modulation light, and reflect the first modulation light to the first polarization element;
a second polarization element having nonreciprocal optical activity, and configured to rotate a polarization plane of the first modulation light that passes through the first polarization element again and is transmitted through the light splitting surface; and
a second reflective spatial light modulator configured to modulate the first modulation light that passes through the second polarization element to generate second modulation light, and reflect the second modulation light to the second polarization element,
wherein the second modulation light passes through the second polarization element again, is reflected by the light splitting surface, and then is output.

6. The optical module according to claim 5,
wherein the polarization beam splitter includes
a light input surface configured to input the input light;
a light output surface configured to output the second modulation light;
a first surface optically coupled to the first polarization element; and
a second surface optically coupled to the second polarization element.

7. The optical module according to claim 5, further comprising:
a ½-wavelength plate arranged either between the polarization beam splitter and the first reflective spatial light modulator or between the polarization beam splitter and the second reflective spatial light modulator.

8. An optical observation apparatus, comprising:
the optical module according to claim 5;
a mounting table configured to support an observation target;
a first light-guiding optical system configured to guide light from the observation target to the polarization beam splitter as the input light;
a second light-guiding optical system configured to guide the second modulation light output from the polarization beam splitter; and
a light detector configured to detect the second modulation light guided by the second light-guiding optical system.

9. A light irradiation apparatus, comprising:
the optical module according to claim 5;
a mounting table configured to support an irradiation target;
a light source configured to output the input light that is input to the polarization beam splitter; and
a light-guiding optical system configured to guide the second modulation light output from the polarization beam splitter to the irradiation target.

10. The optical module according to claim 6,
wherein the light input surface and the light output surface are arranged side by side in a first direction, and
the first surface and the second surface are arranged side by side in a second direction intersecting with the first direction.

11. The optical module according to claim 6, further comprising:
a third polarization element optically coupled to the light input surface, wherein the third polarization element rotates the polarization plane of the input light so that the input light includes the s-polarization component.

12. The optical module according to claim 1, further comprising:
a ½-wavelength plate arranged either between the polarization beam splitter and the first reflective spatial light modulator or between the polarization beam splitter and the second reflective spatial light modulator.

13. An optical observation apparatus, comprising:
the optical module according to claim 1;
a mounting table configured to support an observation target;
a first light-guiding optical system configured to guide light from the observation target to the polarization beam splitter as the input light;
a second light-guiding optical system configure to guide the second modulation light output from the polarization beam splitter; and
a light detector configured to detect the second modulation light guided by the second light-guiding optical system.

14. A light irradiation apparatus, comprising:
the optical module according to claim 1;
a mounting table configured to support an irradiation target;
a light source configured to output the input light that is input to the polarization beam splitter; and
a light-guiding optical system configured to guide the second modulation light output from the polarization beam splitter to the irradiation target.

* * * * *